(12) United States Patent
McDonald et al.

(10) Patent No.: US 11,567,776 B2
(45) Date of Patent: Jan. 31, 2023

(54) BRANCH DENSITY DETECTION FOR PREFETCHER

(71) Applicant: CENTAUR TECHNOLOGY, INC., Austin, TX (US)

(72) Inventors: Thomas C. McDonald, Austin, TX (US); Brent Bean, Austin, TX (US)

(73) Assignee: CENTAUR TECHNOLOGY, INC., Austin, TX (US)

( * ) Notice: Subject to any disclaimer, the term of this patent is extended or adjusted under 35 U.S.C. 154(b) by 23 days.

(21) Appl. No.: 17/087,739

(22) Filed: Nov. 3, 2020

(65) Prior Publication Data
US 2022/0137974 A1 May 5, 2022

(51) Int. Cl.
*G06F 9/30* (2018.01)
*G06F 9/38* (2018.01)
*G06F 9/32* (2018.01)

(52) U.S. Cl.
CPC ........ *G06F 9/3804* (2013.01); *G06F 9/30047* (2013.01); *G06F 9/30134* (2013.01); *G06F 9/321* (2013.01); *G06F 9/3844* (2013.01)

(58) Field of Classification Search
CPC ...... G06F 9/3844; G06F 9/30134; G06F 9/32; G06F 9/3804; G06F 9/30047
See application file for complete search history.

(56) References Cited

U.S. PATENT DOCUMENTS

| | | | |
|---|---|---|---|
| 6,792,524 B1 * | 9/2004 | Peterson | G06F 9/3842 712/234 |
| 8,661,229 B2 * | 2/2014 | Sartorius | G06F 9/3844 712/207 |
| 9,477,479 B2 * | 10/2016 | Greenhalgh | G06F 9/3804 |
| 9,836,304 B2 * | 12/2017 | Denman | G06F 9/3844 |
| 10,296,463 B2 * | 5/2019 | Kitchin | G06F 9/3802 |
| 10,754,778 B2 * | 8/2020 | Meredith | H04L 47/24 |
| 2011/0035551 A1 | 2/2011 | Hooker et al. | |
| 2014/0108740 A1 * | 4/2014 | Rafacz | G06F 12/0862 711/137 |

FOREIGN PATENT DOCUMENTS

TW 201419145 A 5/2014

* cited by examiner

*Primary Examiner* — Corey S Faherty
(74) *Attorney, Agent, or Firm* — McClure, Qualey & Rodack, LLP

(57) ABSTRACT

In one embodiment, a microprocessor, comprising: first logic configured to dynamically adjust a maximum prefetch count based on a total count of predicted taken branches over a predetermined quantity of cache lines; and second logic configured to prefetch instructions based on the adjusted maximum prefetch count.

20 Claims, 5 Drawing Sheets

BRANCH DENSITY DETECTION FOR PREFETCHER

TECHNICAL FIELD

The present invention relates in general to microprocessors, and in particular, prefetching in microprocessors.

BACKGROUND

When a microprocessor executes program instructions, the microprocessor fetches the instructions from memory into the microprocessor using a processor bus. The time required to fetch instructions from memory may consume many clock cycles (e.g., hundreds of clock cycles). To reduce this problem, microprocessors include cache memory. The cache memory—typically much smaller than the system memory—is a memory internal to the microprocessor (or processor core) that stores a subset of the instructions located in the system memory. Though prefetching is important for both instructions and data, emphasis herein is placed on the instruction cache. When the microprocessor fetches an instruction, the microprocessor checks to see if the instruction is present in the cache and is valid. If so, the instruction can be executed more quickly than if the instruction had to be retrieved from system memory. That is, the microprocessor does not have to wait while the instruction is fetched from the memory into the cache using the processor bus. The condition where the microprocessor detects that the instruction is present in the cache and valid is commonly referred to as a cache hit. The condition where the referenced instruction is not present in the cache is commonly referred to as a cache miss. When the referenced instruction is already in the cache memory, significant time savings are realized, by avoiding the extra clock cycles required to retrieve the instruction from external memory.

Cache prefetching is a technique used by microprocessors to further boost execution performance by fetching instructions from external memory into a cache memory, before the instructions are actually needed by the microprocessor. Instruction cache fetches typically look ahead sequentially a predefined number of cache lines (e.g., fetch ahead ten (10) cache lines, or four (4) cache lines, etc.). Successfully prefetching instructions avoids the latency that is encountered when having to retrieve instructions from external memory (avoid consuming bus bandwidth or the bandwidth to other caches, as explained below).

There is a basic tradeoff in prefetching. As noted above, prefetching can improve performance by reducing latency (by already fetching the instructions into the cache memory, before it is actually needed). On the other hand, if too much information (e.g., too many cache lines) is prefetched, then the efficiency of the prefetcher may be reduced, and other system resources and bandwidth may be overtaxed. Furthermore, if a cache is full, then prefetching a new cache line into that cache may result in eviction from the cache of another cache line. Thus, a line in the cache that was in the cache because it was previously needed might be evicted by a line that only might be needed in the future.

In some microprocessors, the cache is actually made up of multiple caches. The multiple caches are arranged in a hierarchy of multiple levels. For example, a microprocessor may have two caches, referred to as a lower, first-level (L1) cache and a higher, second-level (L2) cache. The L1 cache is closer to the computation elements of the microprocessor than the L2 cache. That is, the L1 cache is capable of providing instructions to the computation elements faster than the L2 cache. The L2 cache is commonly larger than the L1 cache, although not necessarily so. Some microprocessors may have a third cache (L3), which may be larger than the L2 cache. Fetch times increase as fetches go from L1, L2, L3 caches, and system memory based on a cache miss (e.g., 10-20 clock cycles from L2, 20-30 clock cycles from L3 for illustration), and so it is desirable from a latency standpoint to intelligently store instructions in the L1 cache.

A microprocessor uses a variety of instruction types, including branch instructions, or simply branches, which include unconditional branches (e.g., branches that are always taken) and conditional branches (e.g., taken or not taken depending on evaluation of a specified condition). A prefetching scheme should take into account these various types of instructions to ensure efficiency of pipeline operations and more particularly, reduction in wasted cycles consumed in fetching instructions.

SUMMARY

In one embodiment, a microprocessor, comprising: first logic configured to dynamically adjust a maximum prefetch count based on a total count of predicted taken branches over a predetermined quantity of cache lines; and second logic configured to prefetch instructions based on the adjusted maximum prefetch count.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the invention can be better understood with reference to the following drawings. The components in the drawings are not necessarily to scale, with emphasis instead being placed upon clearly illustrating the principles of the present invention. Moreover, in the drawings, like reference numerals designate corresponding parts throughout the several views.

DETAILED DESCRIPTION

Figure 1A:
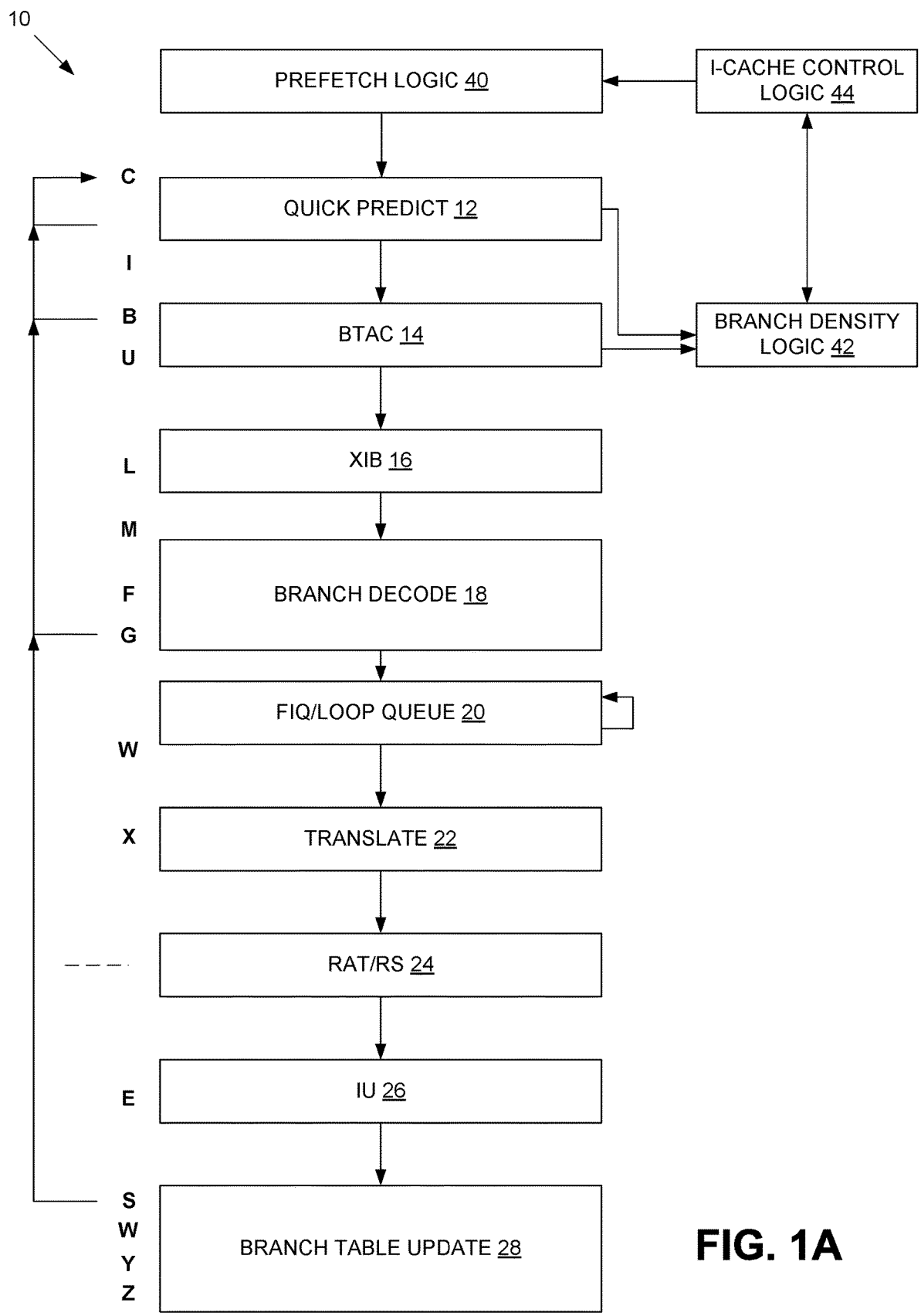
FIG. 1A is a block diagram showing an example branch unit pipeline for a microprocessor in which an embodiment of an adjustable prefetching system is implemented.

Certain embodiments of an adjustable prefetching system and method are disclosed for a microprocessor that monitor branch instruction density among instructions currently being fetched, and throttle prefetching of instructions based on the density. In one embodiment, an adjustable prefetching system comprises branch density logic, instruction cache control logic, and prefetch logic. The branch density logic is configured to determine a branch density value comprising the quantity of branch instructions predicted taken for a predefined number of cache lines, and communicate the branch density value to the instruction cache control logic. The instruction cache control logic comprises adjustable logic and determines whether to adjust a maximum prefetch quantity based on the determined quantity. The adjusted maximum quantity is provided to the prefetch logic, which in turn adjusts prefetching of instructions based on the adjusted maximum prefetch count, the prefetched instructions loaded into the instruction cache.

Digressing briefly, microprocessors today may use a predetermined instruction prefetch count that is applied for all instructions. The prefetch count refers to the number of fetches of a given size (e.g., 16 bytes, or other value in some embodiments). When prefetching is performed for code that relies heavily on sequential fetches, the predetermined fetch count works well to ensure a steady stream of instructions in the instruction cache. However, as the density of branch instructions, and in particular, predicted taken branches, increases for a given span of cache lines, instructions loaded to the instruction cache based on a prefetching scheme are removed and replaced beginning with the target instructions, which means that bus bandwidth or bandwidth to higher level caches (e.g., L2, L3) are unnecessarily consumed for those now-evicted cache lines. Further, cache lines that may have been needed in the near term may no longer be available, again wasting bus bandwidth to memory or to the higher level caches. In contrast, certain embodiments of an adjustable prefetching system monitor the density of the predicted taken branches and dynamically adjust the prefetching scheme based on the branch instruction density (e.g., branch density value or count) to ensure fetch bandwidth is efficiently used and not needlessly consumed.

Having summarized certain features of an adjustable prefetching system of the present disclosure, reference will now be made in detail to the description of an adjustable prefetching system as illustrated in the drawings. While an adjustable prefetching system will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons skilled in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit (VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g. Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

FIG. 1A shows an embodiment of an example branch unit pipeline for a microprocessor 10. It should be appreciated that certain known components of a microprocessor 10 are omitted here for brevity and ease of explanation and illustration. As is known, the pipeline architecture provides for multiple instructions that are overlapped in execution, with each stage referred to as a pipe stage. The blocks shown in the branch unit pipeline may each be implemented according to one or more stages, those stages shown to the left of the blocks and represented in the depicted embodiment by the upper-case letters C, I, B, U, L, M, F, G, W, X, E, S, W, Y, and Z that are sequentially advanced from top-down and as redirected (as shown by the arrows). It should be appreciated by one having ordinary skill in the art that the number and/or arrangement of stages depicted in FIG. 1A is merely illustrative of one example embodiment, and that in some embodiments, a different number and/or arrangement of stages may be implemented and hence contemplated to be within the scope of the disclosure. It should also be appreciated by one having ordinary skill in the art that the blocks provide a general description of functionality for the branch pipeline, and that associated logic or circuitry known to those having ordinary skill in the art is omitted here for brevity. For instance, it should be appreciated by one having ordinary skill in the art that each stage of the pipeline may be separated by clocked pipeline registers or latches, as is known. As another example, though not explicitly shown in FIG. 1A, it should be appreciated by one having ordinary skill in the art that operations at the front end involve data exchange or interaction with an instruction cache. Of particular note, logic for prefetching is intended to show operation in parallel with the front end operations of the pipeline, as explained further below.

An instruction cache is a random access memory device within a microprocessor into which the microprocessor places instructions of an ISA machine language program (such as x86 ISA machine language instructions) that were recently fetched and/or pre-fetched from larger cache (e.g., L2 cache, L3 cache) or system memory (e.g., fetched and/or pre-fetched from DRAM by a bus interface unit) and performed by the microprocessor 10 in the course of running the ISA machine language program. The ISA defines an instruction address register that holds the memory address of the next ISA instruction to be performed (defined by the x86 ISA as an instruction pointer (IP) though sometimes referred to as a program counter (PC)), and the microprocessor updates the instruction address register contents as it runs the machine language program to control the flow of the program. The ISA instructions are cached for the purpose of subsequently fetching, based on the instruction address register contents, the ISA instructions more quickly from the instruction cache rather than from system memory the next time the flow of the machine language program is such that the register holds the memory address of an ISA instruction present in the instruction cache. In particular, an instruction cache is accessed based on the memory address held in the instruction address register (e.g., IP), rather than exclusively based on a memory address specified by a load or store instruction. Thus, a dedicated data cache that holds ISA instructions as data—such as may be present in the hardware portion of a system that employs a software translator—that is accessed exclusively based on a load/store address but not by an instruction address register value is not an instruction cache. Furthermore, a unified cache that caches both instructions and data (i.e., that is accessed based on an instruction address register value and on a load/store address, but not exclusively based on a load/store address) is intended to be included in the definition of an instruction cache for purposes of the present disclosure.

Directing attention in particular to the branch unit pipeline of the microprocessor 10 of FIG. 1A, the microprocessor 10 comprises a pipelined microprocessor whose instruction set, in one embodiment, conforms substantially to the x86 architecture instruction set. As will be appreciated by persons having ordinary skill in the art from the description provided herein, the present invention may be implemented in a variety of various circuit configurations and architectures, and the architecture illustrated in FIG. 1A is merely one of many suitable architectures. The example microprocessor 10 comprises a quick predictor 12, branch target address cache (BTAC) 14, instruction byte queue (XIB) 16, a branch decoder 18, format instruction queue (FIQ)/loop queue 20, instruction translator 22, register alias table (RAT)/reservation stations (RS) 24, functional units (e.g., integer unit, floating point unit, etc.) 26, and a branch table updater 28. Each of the numerically-referenced blocks of the microprocessor 10 correspond to logical circuits that are implemented over the corresponding plurality of stages C, I, B, U, L, M, F, G, W, X, E, S, W, Y, and Z, with the pipeline architecture enabling different groups of instructions at every stage. In one embodiment, four or more instructions may be run at every stage, with control signals marking each stage along the pipeline. Stages in association with the quick predictor 12, BTAC 14, and XIB 16 involve accesses to an instruction cache (I-cache, not shown in FIG. 1A).

The quick predictor 12 comprises a single cycle branch predictor that provides for single cycle prediction (e.g., takes one cycle to produce a target address, the prediction provided at the I stage in one embodiment). In one embodiment, the quick predictor 12 comprises a table (also referred to herein as array or target array) that stores branch target addresses of previously executed branch instructions, the table enabling a branch prediction when the stored branch instructions are subsequently encountered. In one embodiment, the table comprises 128 entries, though tables of other sizes (e.g., 64 entries, 32 entries, etc.) may be used in some embodiments. The table is organized as an n-way (e.g., n is an integer greater than one) set associative cache. In one embodiment, each entry stores eight (8), 3-bit counters and the current local branch pattern, the counter chosen by a 3-bit local branch pattern. The quick predictor 12 further comprises a conditional branch predictor that is accessed in parallel with the table and that provides a taken/not taken direction for conditional branches. The quick predictor 12 further comprises a return stack that can provide a target instead of the table. In one embodiment, the return stack comprises four (4) entries and provides the target for return instructions. Note that the specifications listed above are merely for illustration, and that some embodiments may perform under different specifications and hence are contemplated to be within the scope of the invention. The quick predictor 12 is configured to deliver a predicted branch target immediately (within a single cycle) with no taken branch penalty. In some embodiments, the quick predictor 12 may operate according to other specifications for its prediction mechanism and/or table configuration, or in some embodiments, may be omitted. Most branches are correctly predicted by the quick predictor 12. In some embodiments, where the quick predictor 12 provides a branch prediction that differs (e.g., difference in direction and/or target) from the branch prediction of the BTAC 14 based on the same fetched branch instruction, the BTAC 14 overrides the branch prediction of the quick predictor 12 and updates the quick predictor table within the set of stages of the BTAC 14, for instance, at the U stage, with the branch prediction information (e.g., direction, target address, branch prediction type) provided by the BTAC 14.

The I stage and/or B stage correspond to access to the various tables of the branch unit pipeline, including the I-cache, tag arrays, translation lookaside buffer (TLB) arrays, BTAC arrays, return stack arrays, etc., muxing out the direction or way (e.g., based on the tags), and reading out of the instructions.

The BTAC 14 holds information about previously executed branch instructions that it uses to predict the target address, direction, and type during subsequent executions. The BTAC 14 comprises one or more tables that are much larger than the table of the quick predictor 12. In one embodiment, the BTAC 14 comprises a 4 k entry, m-way set-associative table (also referred to herein as array or target array), where m is an integer greater than one. Each entry of the BTAC 14 comprises a valid bit, a branch target address prediction, a direction prediction, and a branch type. The branch type specifies whether the branch instruction is a call/return, indirect branch, conditional relative branch, or unconditional relative branch. In one embodiment, the BTAC 14 comprises or cooperates with a conditional relative branch predictor having a multiple entry (e.g., 12 k)

tagged geometric length (TAGE)-based predictor, multiple tables, a multi-bit (e.g., 3 bit), taken/not taken (T/NT) counter, and multi-bit global branch history. As another example, the indirect prediction comprises a multiple entry (e.g., 1.5 k) TAGE predictor and uses the table entries for static indirect branches. Note that in some embodiments, other types of prediction mechanisms may be used, including correlation-based prediction mechanisms, predictors that use a combination of global and local branch history, etc. For each portion, or fetch quantum (e.g., 16 bytes as a non-limiting example), of a cache line (e.g., 64 bytes as a non-limiting example) of the instruction cache, the BTAC 14 can hold three entries (e.g., sides A, B, and C, though fewer sides may be used in some embodiments for storing prediction information for fewer branch instructions) that can hold prediction information for up to three branch instructions that may be present in a portion of the cache line. The BTAC 14 comprises operations through a set of stages (e.g., the I, B and U stages). In effect, the U stage of a branch instruction serves as a C stage for the target (e.g., the arrow from the B stage to the C stage reflects the situation of the branch instruction at the B stage and the next clock is the C stage of the target or herein also, the cache address), resulting in a two-clock delay for BTAC prediction.

The BTAC 14 has a two clock taken penalty, which also reveals a benefit of the quick predictor 12 in providing a rapid branch prediction (no taken penalty) by immediately steering the new cache address to be the target. In one embodiment, the BTAC 14, being larger than the quick predictor 12 and having a more sophisticated branch prediction mechanism, is configured to (e.g., always) override the branch prediction of the quick predictor 12 when there is a disagreement in branch prediction (e.g., the BTAC 14 determines a different branch prediction than the taken determination and/or branch target address determined by the quick predictor 12). In some embodiments, the BTAC 14 is configured to update the quick predictor 12 during one of the BTAC stages (e.g., the U stage) by writing the branch prediction information into the table of the quick predictor 12 (and also in the tables of the BTAC 14). In some embodiments, updates to the BTAC 14 are delayed until a branch is executed or retired, where the updates to the BTAC 14 involve writes to a BTAC table and/or a TAGE table. In one embodiment, updates involve target information and/or counter updates. However, updates to the quick predictor 12 do not wait that long, occurring during a BTAC stage. Note that branches that are not in the quick predictor 12 are written into the quick predictor 12 two cycles later at a time corresponding to (e.g., during) a BTAC stage.

The XIB 16 is a queue of entries, each of which holds sixteen bytes of data from the instruction cache. For instance, the cache data that comes from the XIB 16 is simply a stream of instruction bytes that comes in sixteen byte blocks, and it is unknown where a given x86 instruction begins or ends within the stream or within a given block given that instructions are of variable length. The XIB 16 comprises known logic to determine and mark the beginning and ending byte of each instruction within the stream and thereby break up the stream of bytes into a stream of x86 instructions, which is provided to and stored in the FIQ/loop queue 20 for processing by the remainder of the microprocessor pipeline. In the L (length) stage, the XIB 16 determines the instruction lengths. Information about branch length marking, to the extent such information is supplemental and consistent with the teachings of the present disclosure, may be found in U.S. Pat. No. 8,473,862, herein incorporated by reference. In one embodiment, a predecoder (not shown in FIG. 1A) is implemented at the U stage, and is configured to detect potential branch instructions and mark them as such for each instruction byte in the queues. Notably, at this stage, there is ambiguity as to whether a given byte is the start of an instruction. If a byte is an opcode byte of a branch instruction determined at a later (M stage), then the instruction is affirmed as a branch instruction. For instance, the branch decoder 18 comprises an instruction mux (not shown) for muxing instructions in a mux or M stage, where the branch instructions are affirmed as such.

In the F stage, the instructions are formatted as explained above. In one embodiment, the formatted instructions comprise instructions conforming substantially to the x86 architecture instruction set. Also, a determination is made at the M stage whether a given instruction, perhaps marked preliminarily by the predecoder, was indeed a branch or not. For instance, where a miss occurred in the quick predictor 12 or BTAC 14 (e.g., at initial start-up), the branch decoder 18 (e.g., the instruction mux) decides the current instruction is a branch and redirects at stage G the cache address to the new target and update the tables in the front end of the microprocessor 10. In effect, the branch decoder 18 provides for branch prediction when missed at the quick predictor 12 or BTAC 14, where the branch instruction transitions to the target at the C stage. In some circumstances, such as where there are more than a limited or predetermined maximum number of branches per fetch (e.g., more than three per 16 byte fetch) at the BTAC 14, branch prediction for the extra branch is delayed until decode time. Information about the M and F stages, to the extent such information is supplemental and consistent with the teachings of the present disclosure may be found in U.S. Pat. No. 8,473,862, herein incorporated by reference.

The FIQ/loop queue 20 receives the formatted instructions and buffers them until they can be translated into microinstructions. The FIQ/loop queue 20 also provides for a preliminary decoding and fast looping function (e.g., on a BTAC loop branch, the loop queue is activated and loop instructions are repeatedly sent), the latter represented by the arrow at the right hand side of the block 20.

The W stage provides for an optional extra timing clock.

At the X stage, the instruction translator 22 translates (in the X or translate stage) the formatted instructions stored in the FIQ/loop queue 20 into microinstructions.

The instructions are provided in program order to a register alias table/reservation tables (RAT/RS) 24. The RAT functionality of the RAT/RS 24 maintains and generates dependency information for each instruction. The RAT functionality of the RAT/RS 24 renames the sources and destinations of the instructions onto internal registers, and dispatches the instructions to reservation stations of the RAT/RS 24, which issue the instructions, potentially out of program order, to functional units 26. The functional or execution units 26, which include integer units, execute branch instructions at stage E (execution). Execution units, branch units, and integer units are terms that are used interchangeably herein. In one embodiment, the execution units 26 (e.g., two execution units) execute two branches in a single clock cycle. The execution units 26 also indicate whether the BTAC 14 has correctly predicted the branch instruction.

Results of the execution are provided in one embodiment to a reorder buffer (not shown), which comprises information pertaining to instructions that have been executed. As is known, the reorder buffer keeps the original program order of instructions after instruction issue and allows result serialization during a retire stage.

The branch table update 28 comprises stages S, W, Y, and Z, and is configured to update (e.g., at the S stage) the various tables at the front end (e.g., BTAC, TAGE) with information about the fully decoded and executed branch instruction (e.g., the final result of the branch). The update may involve, at stages S, W Y, and Z, a table read, a target address write, and a counter increment or decrement, which may involve some delays.

The microprocessor 10 further comprises additional logic pertaining to prefetching and monitoring of branch density or branch instruction predicted taken density. As is known, prefetching of instructions to load the same into the instruction cache allows for quicker, bandwidth limited access of instructions as opposed to retrieving from higher level cache memory (e.g., L2, L3), or system memory via the processor bus. Prefetching may be implemented at least in part using known software and/or, as emphasized herein, hardware prefetching schemes, including primarily next line or sequential prefetching, but in some embodiments may include one or more of stride prefetching (e.g., IP based, cache block address based, including stream buffering), locality based prefetching, content based prefetching, correlation based prefetching, precomputation or execution based prefetching, etc.). In one embodiment, an adjustable prefetching system comprises the prefetch logic 40, branch density logic 42, and an instruction cache (I-cache) control logic 44.

The prefetch logic 40 may implement any one or a combination of the known prefetching schemes indicated above, and is used to prefetch instructions (e.g., from higher level cache(s) or system memory) for populating an instruction cache.

The branch density logic 42 comprises functionality to monitor the branch density or, more specifically, the branch instructions predicted taken for a given parameter. In one embodiment, the given parameter may be a predefined (predetermined) quantity of cache lines (e.g., 16 cache lines, 32 cache lines, etc.), wherein each cache line comprises one or, typically, plural x86 instructions. The branch density logic 42 receives input from branch prediction logic comprising one or a combination of the quick predictor 12 and the BTAC 14. The branch prediction logic provides (e.g., at the U stage) an indication of whether a branch is taken or not taken, and the U stage also provides an indication of whether a sequential fetch is being processed. The branch density logic 42 can thus determine whether the last predefined span or set of fetches comprises a high branch density portion of the code where throttling back the prefetching may reduce the quantity of wasted instructions (since if a branch is predicted taken, a prefetching scheme based on sequential instructions renders the cached instructions unsuitable since instructions after the target need to be cached and the prior instructions evicted from the instruction cache). In other words, during consumption of a predefined quantity or span of cache lines where there is a high density of branch instructions predicted taken, the branch density logic 42 is configured to detect these high branch density conditions and tally a count of predicted taken branches to prevent the microprocessor 10, and in particular, the prefetch logic 40, from consuming wasted bandwidth through prefetches from the higher level cache or system memory while fetching code with high branch density.

The I-cache control logic 44 comprises control logic that coordinates prefetching (e.g., commenced in one embodiment after a cache miss) and loading to the instruction cache according to a maximum prefetch count and an adjusted prefetch count (variably adjusted based on branch density), as explained further below in association with FIGS. 2-3. In one embodiment, the I-cache control logic 44 comprises adjust logic that is configured to adjust a maximum prefetch count based on a branch density value (e.g., count) determined from the branch density logic 42. In some embodiments, the I-cache control logic 44 further comprises a register (e.g., a feature control register) that holds the maximum prefetch count.

Figure 1B:
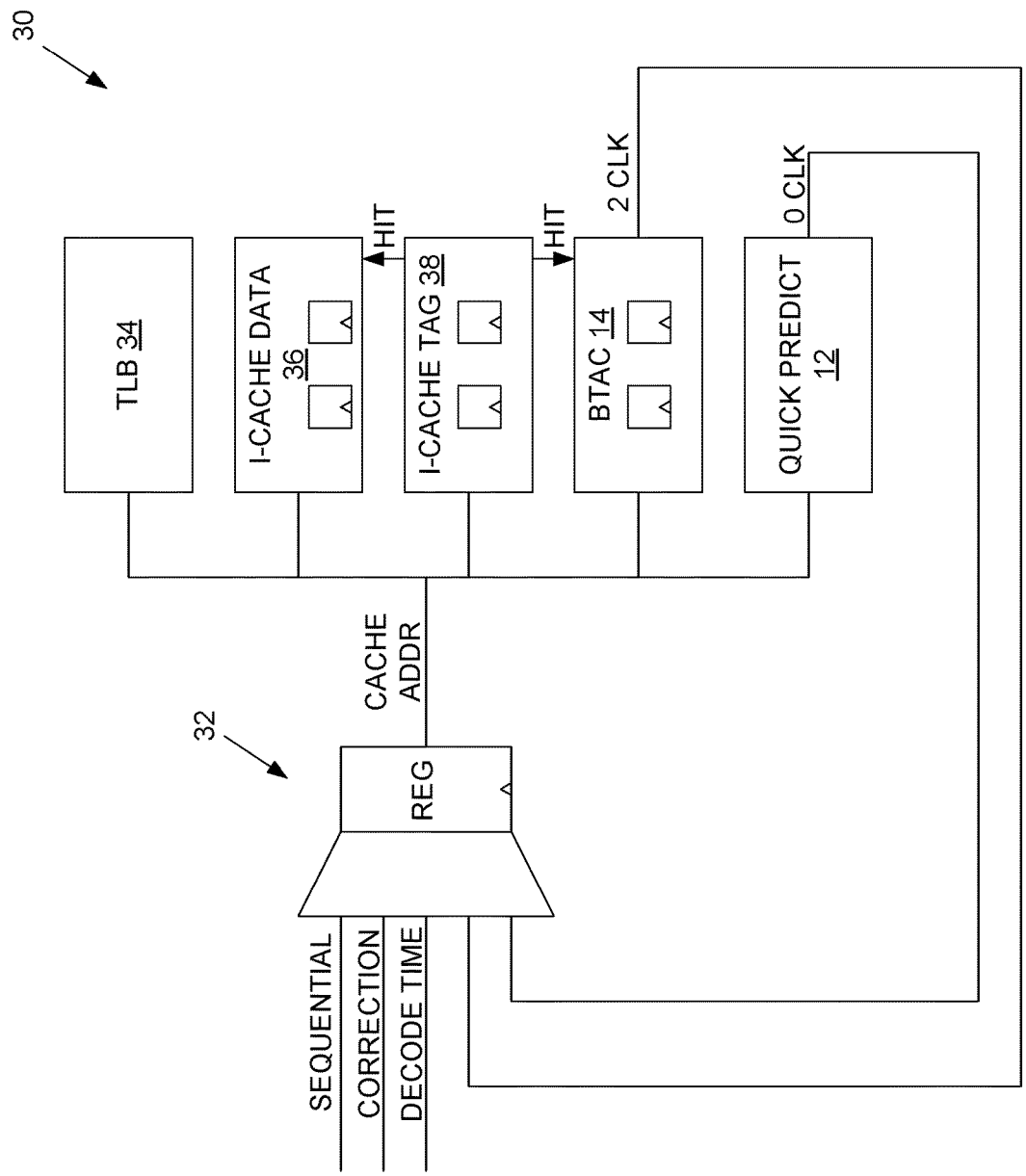
FIG. 1B is a schematic diagram showing an example front end of the branch unit pipeline shown in FIG. 1A.

Referring now to FIG. 1B, with continued reference to FIG. 1A, shown is an example quick predictor 12 and other example sources used at a front end 30 of the branch unit pipeline shown for the microprocessor 10 of FIG. 1A. The front end 30 comprises a fetch unit 32 (e.g., including a mux and clocked register), a translation lookaside buffer (TLB) 34, an instruction cache (I-cache data) 36, I-cache tag 38 (or tag array), the BTAC 14, and the quick predictor 12. The fetch unit 32 receives plural sources of cache instruction addresses, including a sequenced instruction address (e.g., from the I-stage), corrected instruction address (e.g., from the S stage), decode time instruction address (e.g., from the G stage), and addresses from the BTAC 14 and quick predictor 12. The output of the fetch unit 32 is a cache address that is provided as inputs to the TLB 34, I-cache data 36, I-cache tag 38, BTAC 14, and quick predictor 12 for accessing the next instruction of the I-cache data 36.

The TLB 34, under management by a memory management unit (not shown), provides for a virtual to physical page address translation as is known. That is, the TLB 34 stores the physical addresses of the most recently used virtual addresses. The TLB 34 receives a linear address from a segmentation unit (which converts the logical address from a program into the linear address), and a portion of the linear address is compared to the entries of the TLB 34 to find a match. If there is a match, the physical address is calculated from the TLB entry. If there is no match, a page table entry from memory is fetched and placed into the TLB 34.

The I-cache data 36 comprises a level 1 cache of instructions that have been fetched or prefetched from L2 or L3 cache memory or main memory. The I-cache data 36 comprises multiple clocked registers.

The I-cache tag 38 comprises an array of tags corresponding to the instructions in the I-cache data 36, and comprises multiple clocked registers, and is used to determine a match between information associated with the fetched cache instruction (e.g., the tag or portion of the cache address) to the I-cache data 36 and BTAC 14.

The BTAC 14 is explained above in association with FIG. 1A, and has multiple clocked registers and a two (2) clock taken penalty. The quick predictor 12, also explained above, has a zero (0) clock taken penalty. For instance, assume fetches along the I-cache at 16 bytes per cycle, and assume a branch instruction at cache address 20 to cache address 95. Note that hexadecimal notation (e.g., 0x0, 0x10, 0x20, etc.) is implied by the address descriptions in this example. Thus, fetches occur at cache address 0, cache address 10, cache address 20 (the branch instruction, but not yet resolved since the BTAC 14 read and mux span multiple cycles, which in some embodiments is the same timing as the I-cache), cache address 30 (relative clock 1), cache address 40 (relative clock 2), and then on the 3rd clock (relative clock 3), the cache instruction fetch is redirected to cache address 95. The taken branch penalty thus comprises two clock cycles in this example, since cache address 30 and 40 occur after the branch. In other words, without the quick predictor 12, the taken branch penalty is always two clocks for this particular design example. With the smaller and faster quick predictor 12, the cache address fetches, in the above example, comprise 0, 10, 20 and 95, with no delay on the cache address and zero taken penalty. As noted above, in some embodiments, the quick predictor 12 may be omitted.

Figure 2:
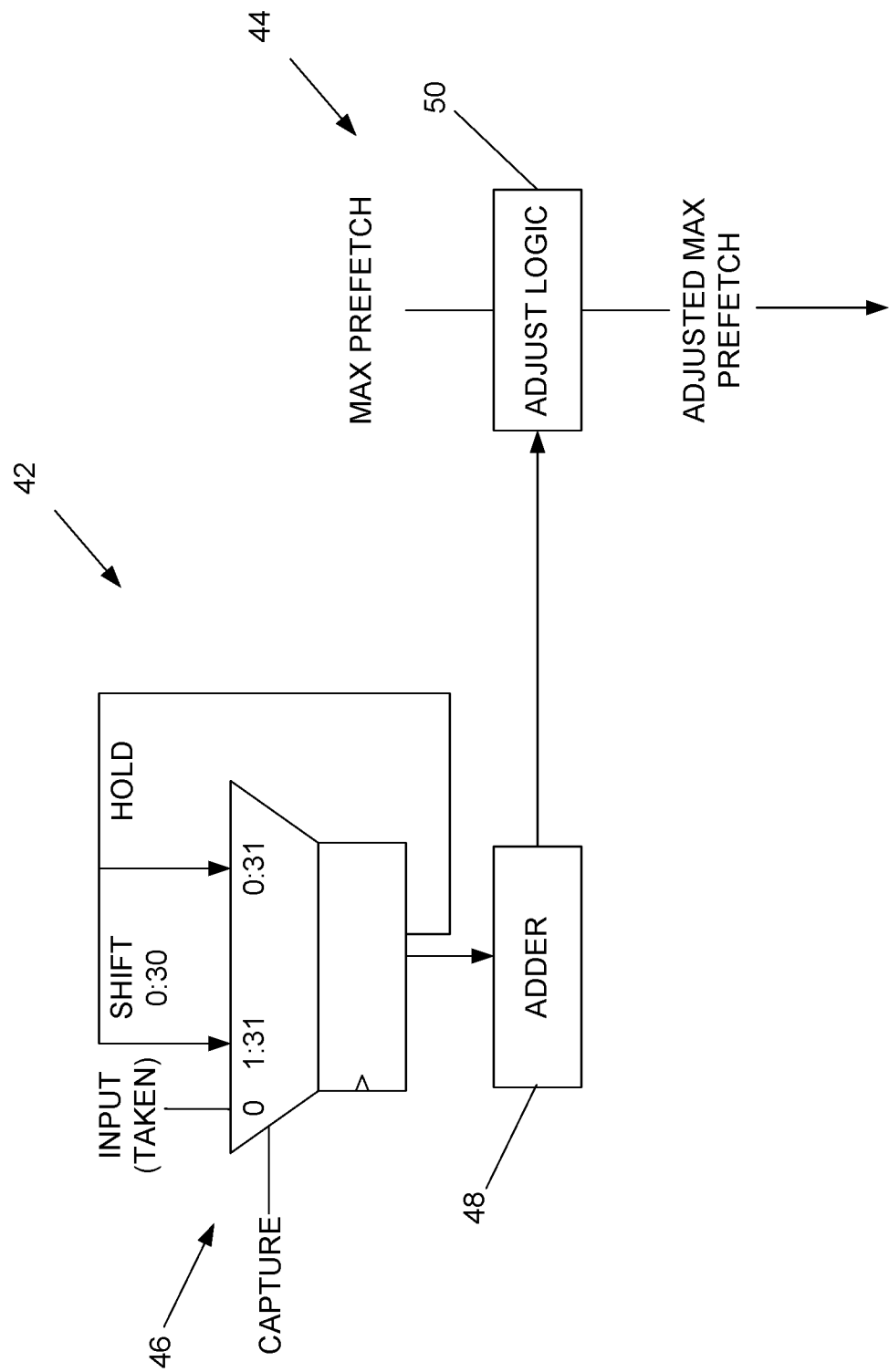
FIG. 2 is a schematic diagram that shows an embodiment of example branch density logic and instruction cache control logic for an embodiment of an adjustable prefetching system.

With continued reference to FIGS. 1A-1B, attention is directed to FIG. 2, which shows an embodiment of example branch density logic 42 and I-cache control logic 44 for an embodiment of an adjustable prefetching system. It should be appreciated by one having ordinary skill in the art that the schematic depicted in FIG. 2 is an illustration of one example embodiment, and that some embodiments may provide for different logic and/or a different arrangement of logic than that depicted to perform similar functionality. In one embodiment, the branch density logic 42 comprises a shift register 46 and adder logic 48, and the I-cache control logic 44 comprises adjust logic 50. In general, the branch density logic 42 shifts in a one bit entry for each predicted taken branch (and shifts in a zero value for sequential fetches at the end of a cache line), and performs a bitwise add of the register value for the last predefined quantity (e.g., 16, 32 as an illustrative, non-limiting example) of cache lines to provide a branch density value or count of how many branch instructions predicted taken are in the predefined quantity of cache lines. Then, the branch density value is provided to the adjust logic 50, where it is used to adjust (if needed) a maximum prefetch count used as a basis for prefetching instructions by the prefetch logic 40.

More specifically, the shift register 46 receives an input (e.g., at the U stage from branch prediction logic comprising the quick predictor 12 and/or BTAC 14), the input providing an indication of sequential fetches or branch instructions predicted taken. The shift register 46 comprises a mux to choose between a shift and a hold, as described further below, and in general, is configured to store the history of whether a given cache line contained a predicted taken branch. The mux select or capture signal activates on a predicted taken branch or sequential fetch at the end of a cache line. A signal at the U stage (e.g., provided by the branch prediction logic) indicates whether a branch is taken or not taken and whether a sequential fetch is currently being processed. The shift register 46 counts the predicted taken branches per cache line. The shift register 46 shifts at the end of a cache line (e.g., the last predefined number of bytes of a cache line, such as 16 or 32 bytes) or at a predicted taken branch. For instance, the shift register 46 shifts in a bit value (e.g., one (1)) for a taken branch, and for a sequential fetch at an end of a cache line and there are no predicted taken branches, shifts in a zero (0). Accordingly, the shift register 46 provides a state for the last predefined number of cache lines, and at any time, may represent a register value (compared to the prior register value) that increases, decreases, or remains the same depending on the bit values that are shifted in and out. Explaining further, if a branch is not taken or the end of the cache line has not been reached, the shift register 46 is merely fed with the current value of the shift register 46. This event or operation is denoted as a "hold" in FIG. 2. In some embodiments, the clocks may merely be turned off, with a similar effect. The shifted path (denoted as "shift" in FIG. 2) reveals that the oldest bit is discarded (e.g., bit 31), effectively representing 33 cache lines ago. A bit value of one (1) is shifted in when there is a hit for a predicted taken branch, thus resulting in a shift in bits from 0:30 to 1:31, as illustratively represented in FIG. 2. A shift of a bit value of zero (0) is implemented when there is a sequential fetch at the end of the cache line.

A bitwise add is performed by the adder logic 48 (or simply, referred to as an adder). In one embodiment, the adder logic 48 adds up the number of bits of, say, a 1 value (for predicted taken) among the thirty-two (32) bits in the shift register 46. For instance, there may be two to four, one or active (1) bits counted, which may reflect a low branch density, or there may be twenty to thirty, one (1) bits counted, which may reflect a high branch density. Thus, in one embodiment, a 6 bit field may hold the result, reflecting the amount of predicted taken branches in thirty-two (32) cache lines.

In another embodiment, a 5 bit field may hold the result of the bitwise add operation performed by the adder logic 48. In other words, the result may be the number of predicted taken branches in sixteen (16) cache lines.

The adjust logic 50 of the I-cache control logic 44 is configured to provide an adjustment from a default or prior maximum prefetch count to an adjusted maximum prefetch count. In one embodiment, the adjust logic 50 comprises a table of scaled values, where a feature control register default, maximum prefetch count is used to choose a row of scaled values. The adjust logic 50 further comprises a mux, where the branch density value is used to choose which entry in the row is used for the adjusted maximum prefetch count. The maximum prefetch count may be set at run-time using bits (e.g., three (3) bit field) in the I-cache control logic 44. In some embodiments, the feature control register of the I-cache control logic 44 may be programmatically set (e.g., referred to sometimes as blowing a fuse, which may be performed via software or adjusted physically) at a chip fabrication plant or elsewhere based on a performance best suited to the application.

In one example operation, a maximum prefetch count may be set at seven (7) cache lines. Through chip operations, the branch density logic 42 may determine the branches predicted taken per, say, the last sixteen (16) cache lines, to be 15-16 branches. Accordingly, the adjust logic 50 may adjust the maximum prefetch count to a lower number (e.g., zero) since it appears that there is branching at almost every cache line (e.g., a high branch density), which means wasted prefetches if assuming a sequential line of fetches (and too much bandwidth consumed in prefetches from higher level cache or memory). Through this adjustment, communicated to the prefetch logic 40 via the I-cache control logic 44, the prefetch logic 40 prefetches according to the adjusted prefetch scheme (e.g., zero prefetches), thus improving performance (e.g., fewer wasted prefetches, reduced fetch bandwidth, reduced latency) since instructions are not being cached that would otherwise be evicted. If the branch density logic 42 determines that 0-2 branches per sixteen (16) cache lines are predicted taken (e.g., a lower branch density), the maximum prefetch count may or may not be adjusted (e.g., preserved or maintained (e.g., at full scale), or may be increased). Some circumstances of branch density, say in between these two examples, may result in a throttling of the prefetching scheme in a scaled way to maintain a given performance metric. In general, the adjust logic 50 scales the maximum prefetch count (e.g., provided initially via a feature control register) based on the branch density value (count) provided by the branch density logic 42, where the scaled value can be any value selected from a range of branch density values, and/or in some embodiments, where selection may be based on a particular branch density value. Explaining further with some example illustrations, if the maximum prefetch count is seven (7) fetches, and if the branch density value or count is, say, sixteen (16), the scaled or adjusted maximum prefetch count may be determined by the adjust logic 50 to be three (3). In other words, the branch density count corresponds to a scaled maximum prefetch count. As another example, if the branch density count is fourteen (14) or fifteen (15) (e.g., falls within a given range), the scaled maximum prefetch count may be four (4), which may continue in this manner (e.g., if the branch density value is one (1) or two (2), the scaled maximum prefetch count may be 9). Then, if the branch density value is zero (0), the scaled maximum prefetch count may be ten (10). In other words, the adjusted (scaled) maximum prefetch count determined by the adjust logic 50 may be produced by a single value, a range of values, or a mix thereof. The values selected may be based on a prior performance metric. In one embodiment, the maximum prefetch count is any value selected between, inclusive, 0-7, and the scaled or adjusted maximum prefetch count is any value selected between, inclusive, 0-10. Note that the values described herein are merely for illustration, and that other values may be used.

Figure 3:
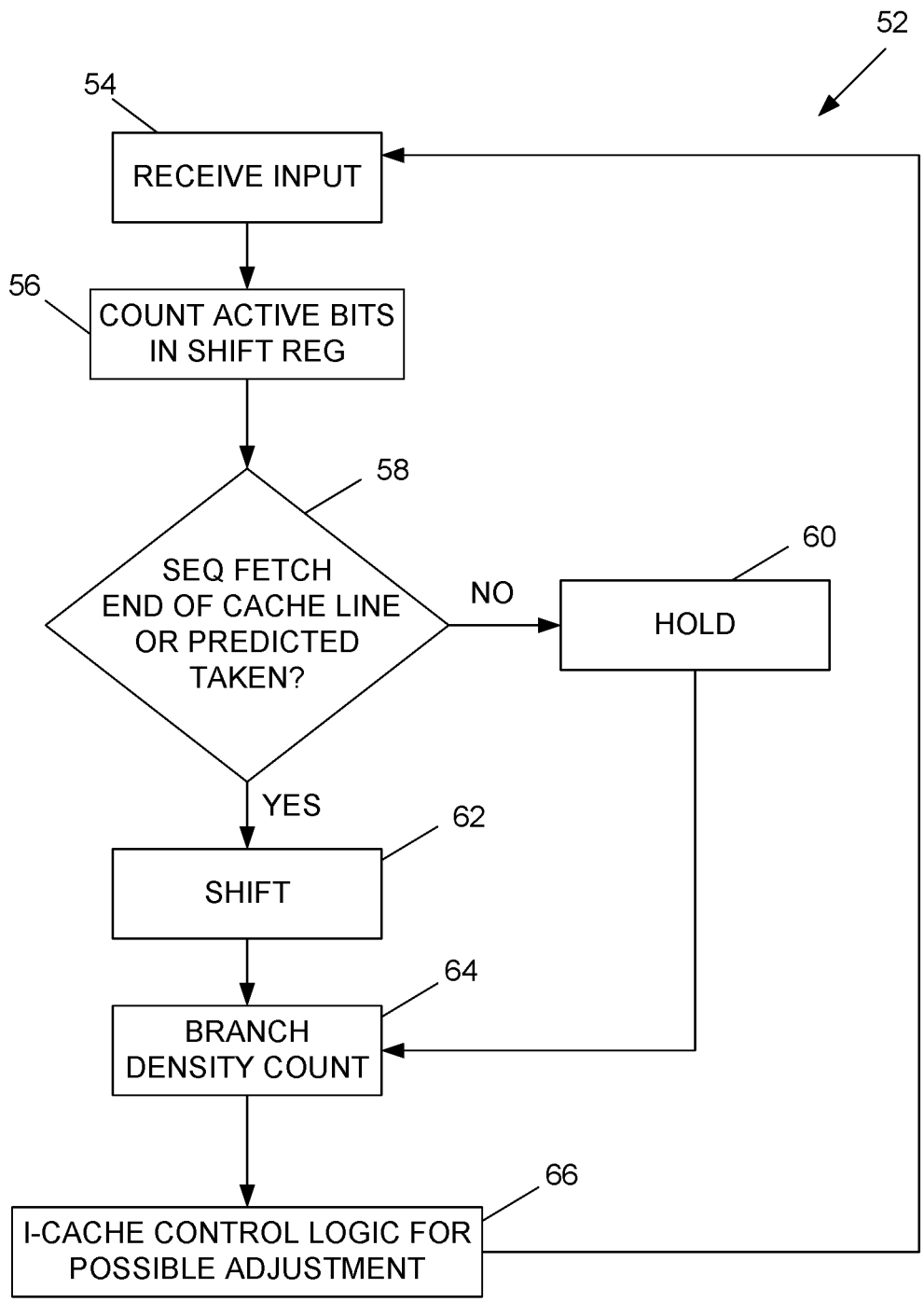
FIG. 3 is a flow diagram that shows an embodiment of an example method of prefetch adjustment for an embodiment of an adjustable prefetching system.

Having described an example embodiment of the branch density logic 42 and I-cache control logic 44 and corresponding operations, attention is directed to FIG. 3 (with continued reference to FIG. 2), which shows an embodiment of an example method of prefetch adjustment for an embodiment of an adjustable prefetching system. The prefetch adjustment method, denoted as method 52, may be implemented in one embodiment by the branch density logic 42. The prefetch adjustment method 42 receives input (54). As indicated above, the input may be a signal at the U stage indicating a sequential fetch or branch instruction predicted taken received at the shift register 46. The prefetch adjustment method 52 provides an initial count of the active bits in the shift register 46 (56), namely, the taken branches for a given parameter (e.g., predefined quantity of cache lines). The prefetch adjustment method 52 determines whether there is a sequential fetch at the end of a cache line or a predicted taken branch (58). If not ("No" to 58), that condition reflects a state where there is neither a predicted taken branch nor a sequential fetch at the end of the cache line, and the shift register holds (60) and then proceeds to (64) as explained below. If so ("Yes" to 58), the shift register shifts in a bit value (62) (e.g., of one (1) for a predicted taken or a zero (0) for a sequential fetch at the end of the cache line), and proceeds to (64).

At (64), the prefetch adjustment method 52 determines the branch density value (branch density count) via the adder logic 48, and at (66) provides the branch density value to the I-cache control logic 44 for possible adjustment from the maximum prefetch count, as explained above. The method 52 continues in an ongoing manner (e.g., receive the next input (54) for the next set of cache lines).

Note that the order of some steps depicted in FIG. 3 may be switched between one another, performed concurrently in some embodiments, some steps may be omitted, or additional steps may be included in some embodiments.

Figure 4:
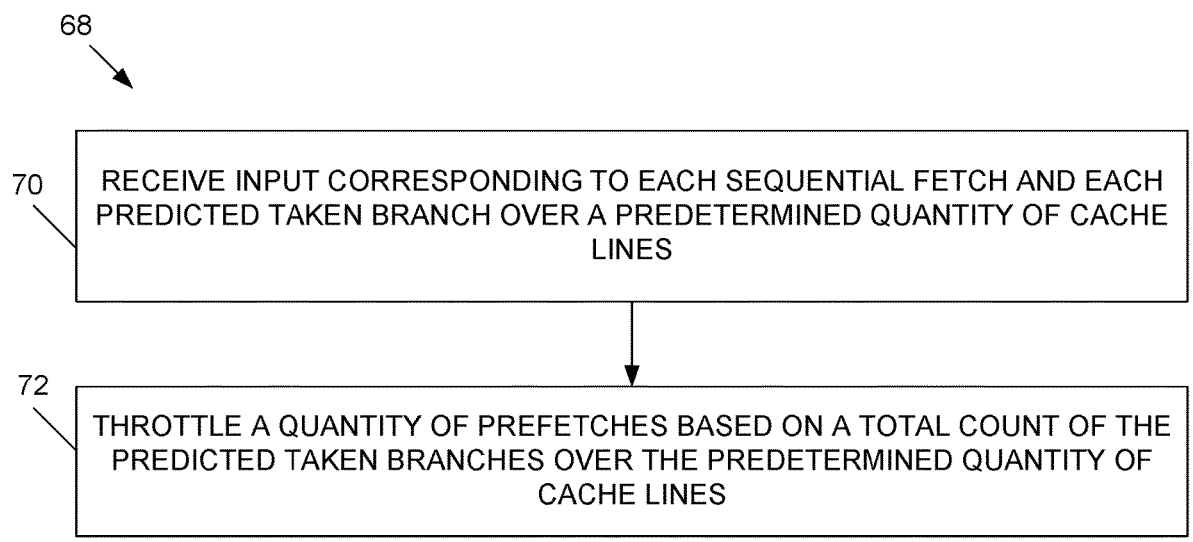
FIG. 4 is a flow diagram showing an embodiment of an example adjustable prefetching method.

Having described certain embodiments of an adjustable prefetching system and method, it should be appreciated that one embodiment of an example prefetch adjustment method, denoted as method 68 in FIG. 4, comprises receiving input corresponding to each sequential fetch and each predicted taken branch over a predetermined quantity of cache lines (70); and throttling a quantity of prefetches based on a total count of the predicted taken branches over the predetermined quantity of cache lines (72).

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, depending on the functionality involved, as would be understood by those reasonably skilled in the art of the present disclosure.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

At least the following is claimed:

1. A microprocessor, comprising:
    an instruction cache;
    a branch prediction logic configured to redirect a fetch to a target address in the instruction cache based on a branch instruction;
    branch density logic configured to determine a branch density value by counting a quantity of branch instructions predicted taken over a predefined number of cache lines based on input from the branch prediction logic; and
    prefetch logic configured to load a dynamically changing amount of prefetches into the instruction cache based on the determination of the branch density value by the branch density logic.

2. The microprocessor of claim 1, wherein the branch density logic comprises a shift register configured to shift in a 1-valued bit for a predicted taken branch instruction and a 0-valued bit for a sequential fetch at an end of a cache line.

3. The microprocessor of claim 2, wherein the branch density logic further comprises adder logic configured to provide a bitwise add of an output of the shift register.

4. The microprocessor of claim 3, further comprising instruction cache control logic configured to adjust a maximum prefetch count based on the determination by the branch density logic.

5. The microprocessor of claim 1, wherein the prefetch logic is configured to operate according to a maximum prefetch count before the determination and an adjusted maximum prefetch count after the determination.

6. The microprocessor of claim 5, wherein the adjusted maximum prefetch count comprises any value selected among a plurality of values based on the branch density value or range of branch density values.

7. The microprocessor of claim 1, wherein the branch prediction logic comprises a quick predictor, a branch table access cache, or a combination of the quick predictor and the branch table access cache.

8. A prefetch adjustment method implemented for a microprocessor, the prefetch adjustment method comprising:
    receiving input corresponding to each sequential fetch and each predicted taken branch over a predetermined quantity of cache lines; and
    throttling a quantity of prefetches based on a total count of the predicted taken branches over the predetermined quantity of cache lines.

9. The prefetch adjustment method of claim 8, further comprising loading an instruction cache according to the throttled quantity of prefetches.

10. The prefetch adjustment method of claim 8, further comprising shifting in a bit value of a shift register for each instance of a predicted taken branch over the predetermined quantity of cache lines.

11. The prefetch adjustment method of claim 10, further comprising performing a bitwise add of an output of bit values of the shift register.

12. The prefetch adjustment method of claim 11, further comprising adjusting a predetermined maximum prefetch count based on the bitwise add.

13. The prefetch adjustment method of claim 12, wherein the adjustment is accomplished via adjust logic.

14. The prefetch adjustment method of claim 8, further comprising prefetching according to a maximum prefetch count before the throttling and prefetching according to an adjusted maximum prefetch count after the throttling.

15. The prefetch adjustment method of claim 14, wherein the adjusted maximum prefetch count comprises any value selected among a plurality of values based on a branch density value or range of branch density values.

16. The prefetch adjustment method of claim 8, wherein receiving the input comprises receiving an indication of each sequential fetch and each predicted taken branch from branch prediction logic.

17. The prefetch adjustment method of claim 16, wherein the branch prediction logic comprises a quick predictor, a branch table access cache, or a combination of the quick predictor and the branch table access cache.

18. A microprocessor, comprising:
first logic configured to dynamically adjust a maximum prefetch count based on a total count of predicted taken branches over a predetermined quantity of cache lines; and
second logic configured to prefetch instructions based on the adjusted maximum prefetch count.

19. The microprocessor of claim 18, further comprising an instruction cache configured to receive the prefetched instructions and third logic configured to count the predicted taken branches.

20. The microprocessor of claim 1, wherein the branch density logic is configured to determine the branch density value by only counting branch instructions predicted taken over the predefined number of cache lines.

* * * * *